United States Patent Office 3,424,846
Patented Jan. 28, 1969

3,424,846
TRIETHYLENEGLYCOL DIGLYCIDYL ETHER MAMMALIAN TUMOR-INHIBITING PARENTERAL COMPOSITIONS AND INJECTION METHODS OF USE INTRA-ARTERIALLY OR INTRAVENOUSLY
James Nairn Greenshields, Blackley, Manchester, Bernard William Langley, Macclesfield, Edward Jervis Vickers, Blackley, Manchester, Arthur Leonard Walpole, Macclesfield, and Michael Henry Currer Williams, Blackley, Manchester, England, assignors to Imperial Chemical Industries Limited, London, England, a corporation of Great Britain
No Drawing. Filed Apr. 19, 1961, Ser. No. 103,995
Claims priority, application Great Britain, Apr. 27, 1960, 17,742/60
U.S. Cl. 424—278        6 Claims
Int. Cl. A61k 25/00

This invention relates to new pharmaceutical compositions and more particularly it relates to pharmaceutical compositions which consist of, or comprise, the compound triethyleneglycol diglycidyl ether and are suitable for parenteral administration to mammals. Triethyleneglycol diglycidyl ether has been found to have a selective growth-inhibitory action in vivo on experimental tumours and the compositions of the invention are used to inhibit the growth of mammalian cancers.

Triethyleneglycol diglycidyl ether is a bis-epoxide and has the formula:

$$CH_2\!-\!\!-\!CH\!-\!CH_2\!-\!O\!-\!CH_2\!-\!CH_2\!-\!O\!-\!CH_2\!-\!CH_2\!-\!O\!-\!CH_2\!-\!CH_2\!-\!O\!-\!CH_2\!-\!CH\!-\!\!-\!CH_2$$
$$\diagdown\!O\!\diagup \hspace{7cm} \diagdown\!O\!\diagup$$

It is known that bis-epoxides can function as non-specific inhibitors of tissue-growth in mammals. Their effect upon growth results from an inhibition of the biological process of cell-division (mitosis) and death of dividing cells. Tumour cells within the mammalian body, in so far as they are characterised by rapid multiplication, are particularly susceptible to mitotic inhibition and destruction by bis-epoxides. However, because of the indiscriminate nature of their action, bis-epoxides affect similarly other body cells which are multiplying at a rate comparable to that of tumour cells, such as cells of the bone-marrow, lymphoid tissues and intestinal epithelium and of the germinal tissues of the reproductive organs. This concomitant damage to normal cells has precluded effective use being made of the growth-inhibitory action of bis-epoxides upon tumours.

Among the bis-epoxides known to have non-specific growth-inhibitory activity are the diglycidyl ethers of various aliphatic diols and, more particularly, the compound ethyleneglycol diglycidyl ether and diethyleneglycol diglycidyl ether. The administration of these two compounds by the intraperitoneal injection of their solutions in arachis oil into rats bearing the Walker tumour is described in the British Journal of Pharmacology and Chemotherapy, 1951, volume 6 at pp. 235–255. However with these compounds, as with all other active bis-epoxides examined, the margin between the lethal dose and that required to produce marked inhibition of tumour growth was found to be too small.

The compound triethyleneglycol diglycidyl ether has not, as far as we are aware, been examined in this way. Indeed, there is no evidence known to us that this compound has previously been prepared. We are aware that United Kingdom patent specification No. 794,632 provides a process for the manufacture, from corresponding diols, of diglycidyl ethers of the formula:

$$\underset{\diagdown\!O\!\diagup}{CH_2\!-\!\!-\!CH}\!-\!CH_2\!-\!O\!-\!CH_2\!-\!R\!-\!CH_2\!-\!O\!-\!CH_2\!-\!\underset{\diagdown\!O\!\diagup}{CH\!-\!\!-\!CH_2}$$

wherein R may stand for an aliphatic, cycloaliphatic or aromatic radical optionally substituted by heteroatoms, in particular oxygen or R may be lacking; that it is stated in the specification that the said diglycidyl ethers are, inter alia, valuable pharmaceutical products and may readily be obtained pure by distillation; and that among the diols which can be used for the production of the said diglycidyl ethers there are mentioned ethyleneglycol and polyglycols such as di- or tri-ethyleneglycol. However, the said specification provides no evidence that any of the diglycidyl ethers of the aforesaid general formula, other than the compounds ethyleneglycol diglycidyl ether and 1:4-butane diol diglycidyl ether, have been prepared, nor what the pharmaceutical utility of these compounds is.

We are aware of United States patent specification No. 2,898,349 which discloses a process for the manufacture of reaction products which consist substantially of a polyether containing at least one glycidyl ether group by reaction of epichlorhydrin with a polyhydric alcohol or a mixture of polyhydric alcohols in the presence of a strong alkali. The list of suitable starting materials for the said process includes ethyleneglycol, diethyleneglycol and triethyleneglycol. However, it is also stated that the reaction products of the invention have no precise constitution and are identified merely by their content of glycidyl and hydroxyl groups and by their chlorine content. In Example 9 there is described the reaction of a mixture of 75 parts of triethyleneglycol and 87 parts of 1:10-decane diol with 370 parts of epichlorhydrin and 155 parts of aqueous 50% caustic soda solution to give 207 parts of a yellow final product which is liquid above 30° C. and has a content of 4.5 epoxide equivalents, 3.32 hydroxide equivalents, a 0.12 chlorine equivalent (by hydrolysis) and a 0.23 chlorine equivalent (by combustion) per kilogramme. We do not know if this mixture contains any triethyleneglycol diglycidyl ether, but it is clearly not a pharmaceutical composition suitable for parenteral administration to mammals.

We are further aware of United States patent specification No. 2,854,461 which discloses, by formula, the diepoxides:

$$\underset{\diagdown\!O\!\diagup}{CH_2\!-\!\!-\!CH}\!-\!CH_2\!-\!O\!-\![R]\!-\!O\!-\!CH_2\!-\!\underset{\diagdown\!O\!\diagup}{CH\!-\!\!-\!CH_2}$$

wherein R can be selected from, inter alia, the groups —$C_2H_4$—, —$C_2H_4OC_2H_4$— and —$C_2H_4OC_2H_4OC_2H_4$—, without providing any evidence that such members of this series have been made.

The above recital embraces that are known to us which most closely approaches the instant invention. It discloses triethyleneglycol diglycidyl ether by formula, and provides processes which are likely to afford access to this compound. It also provides the reasonable expectation that the compound when prepared would possess, in some measure, the growth-inhibitory and cytotoxic activity possessed by its lower homologues ethyleneglycol diglycidyl ether and diethyleneglycol diglycidyl ether. It does not, however, disclose triethyleneglycol diglycidyl ether by name nor does it provide any evidence that this compound has been made. It clearly does not disclose either the compositions of the instant invention nor that these compositions have a selective growth-inhibitory action.

We have now found that triethyleneglycol diglycidyl ether, unlike its lower homologues ethyleneglycol diglycidyl ether and diethyleneglycol diglycidyl ether, can be administered parenterally to tumour bearing mammals in doses sufficient to produce marked inhibition of tumour growth without causing extensive of permanent damage to rapidly proliferating normal tissues. With such doses damage in the haemapoietic (blood forming) tissues is limited mainly to the myeloid elements and the resultant depression in the level of the cellular components of the blood affects principally the polymorphonuclear leucocytes. Recovery from haematological damage is rapid and complete. The selective and transient nature of the toxic effects of triethyleneglycol diglycidyl ether make it uniquely suitable for repeated parenteral and preferably intravenous administration to mammals, affected with cancer, in doses calculated to inhibit tumour growth. The compound has been administered parenterally to a substantial number with brain tumours and more particularly gliomas. Administration has been by intravenous and intraarterial injection, both direct and by perfusion techniques. They have successfully withstood doses of the order of 10-15 cc. of the compound intraarterially and doses of the order of 25 cc. of the compound intravenously. The latter dose corresponds to dosage at about 350 mg./kg.

According to the invention therefore we provide pharmaceutical compositions for parenteral, and preferably intravenous and intraarterial, administration which consist of, or comprise, the compound triethyleneglycol diglycidyl ether.

Triethyeleneglycol diglycidyl ether is a liquid which, when chemically pure, sterile and pyrogen-free, is suitable for use per se for injection purposes. Alternatively, the compositions of the invention may comprise triethyleneglycol diglycidyl ether in admixture with non-toxic diluents and carriers therefore. Suitable diluents and carriers are those pharmaceutical excipients which are known to the art to be suitable for parenteral administration and which additionally are chemically compatible with epoxides, that is to say are essentially neutral in nature and do not contain those anions, for example the thiosulphate anion, which are known to react with epoxide groups. As examples of such pharmaceutical excipients there may be mentioned propylene glycol, diethylenegly-col mono methyl ether, diethyleneglycol mono ethyl ether, glycerol formal, dimethylformamide and dimethylacet-amide. Preferred compositions of the invention are those suitable for intravenous and intraarterial administration. As particularly preferred compositions there may be mentioned sterile and pyrogen-free compositions consisting of, or containing as active ingredient, triethyleneglycol diglycidyl ether having a melting point not lower than —25° C. and an epoxide equivalent (the number of grammes containing an epoxygramme equivalent) of not more than 150.

According to a further feature of the invention we provide a process for the manufacture of triethyleneglycol diglycidyl ether having a melting point not lower than —25° C. and an epoxide equivalent of not more than 150 which comprises the manufacture of crude triethyleneglycol diglycidyl ether by means known from the relevant art followed by purification of the crude product by distillation or sublimation in vacuo, low temperature crystallisation, chromatography, zone-refining, partition between immiscible solvents, or a combination of these, until its melting point rises to not less than —25° C. and its epoxide equivalent falls to a figure not greater than 150.

As methods suitable for the manufacture of crude triethyleneglycol diglycidyl ether there may be mentioned those based upon interaction of triethyleneglycol and an epihalohydrin and upon epoxidation of triethyleneglycol diallyl ether or addition of a hypohalous acid to triethyleneglycol diallyl ether. Suitable crystallisation solvents are for example methanol, ethanol, ethyl acetate and tetrahydrofuran.

According to yet a further feature of the invention we provide a process for the manufacture of the pharmaceutical compositions of the invention which comprises manufacture, by the means specified above, of triethyleneglycol diglycidyl ether having a melting point not lower than —25° C. and an epoxide equivalent of not more than 150 and, if necessary, sterilisation and depyrogenation of the product either prior or subsequent to optional admixture with a pharmaceutical excipient.

Depyrogenation and sterilisation of the compositions of the invention may conveniently be effected for example by addition of a pyrogen adsorbent thereto followed by filtration through a bacteria-proof filter.

The invention is illustrated but not limited by the following examples in which the parts are by weight:

EXAMPLE 1

555 parts of epichlorhydrin are added during 24 hours to a stirred mixture of 450 parts of triethyleneglycol and 1.5 parts of boron trifluoride diethyl etherate at 80° C. with exclusion of moisture. The mixture is stirred for a further 24 hours at 80° C., cooled, and diluted with 1,500 parts of dioxan. 600 parts of anhydrous sodium sulphate are added to the resulting solution which is stirred vigorously in an ice-bath while 525 parts of powdered potassium hydroxide (ca. 80%) are added to it over 45 minutes. The temperature of the mixture is kept between 15 and 25° C. during this addition and for 25 minutes thereafter. The product is then filtered, neutralised to pH 7 with dilute sulphuric acid, dried over sodium sulphate, filtered, and the solvent removed in vacuo. The residual product, which has an epoxide equivalent of ca. 180 is fractionally distilled in vacuo and the fraction B.P. 133–149° C. at 0.1 mm. is recrystallized at low temperature from methanol, ethanol, ether, ethyl acetate or tetrahydrofuran. There is obtained triethyleneglycol diglycidyl ether which melts between —15° and —11° C., has an epoxide equivalent of 131 and is suitable for parenteral administration to mammals.

EXAMPLE 2

2,220 parts of epichlorhydrin are added gradually to a stirred mixture of 1800 parts of triethylene glycol and 6 parts of boron trifluoride diethyl etherate which is kept at 60-70° C. by cooling the reaction vessel. The product is dissolved in 5,200 parts of toluene and the resulting solution is then stirred at 0-10° C. while a cold solution of 1,960 parts of 86% potassium hydroxide in 3,600 parts of water is added to it. The mixture is stirred with ice cooling for a further hour and then the non-aqueous layer is removed, washed twice with 120 parts of water and then brought to pH 7 by the addition of dilute sulphuric acid. This solution is then dried over sodium sulphate, filtered, and the solvent removed in vacuo. There is obtained crude triethylene glycol diglycidyl ether which is then further purified as described in Example 1.

EXAMPLE 3

A mixture of 75 parts of triethylene glycol, 92.5 parts of epichlorhydrin, 0.3 part of boron trifluoride diethyl etherate and 190 parts of methylene chloride is boiled under reflux for 2 hours and then diluted with a further 120 parts of methylene chloride. The resulting solution is stirred at 0–10° C. while 160 parts of a cold aqueous solution containing 50 parts of sodium hydroxide are added to it. The mixture is then stirred at this temperature for a further hour and then the nonaqueous layer is removed and worked up as in the foregoing Examples 1 and 2.

EXAMPLE 4

A stirred mixture of 23 parts of triethylene glycol diallyl ether and a solution of 15 parts of sodium hypochlorite in 300 parts of water is kept at 50° C. while a solution of 9.1 parts of hydrochloric acid in 250 parts of water is added to it over an hour. The mixture is stirred for a further hour at this temperature and is then extracted with three portions of 140 parts of methylene chloride. The combined extract is stirred at 50° C. and 32 parts of an aqueous solution containing 10 parts of sodium hydroxide are added to it. The mixture is then stirred for an hour and then worked up as described in Examples 1–3 to provide triethyleneglycol diglycidyl ether.

The triethylene glycol diallyl ether used as starting material is conveniently prepared from triethylene glycol and allyl bromide by the general method described in the Journal of the American Chemical Society, volume 67 (1945) at p. 45. It boils at 154–156° C. at 14 mm.

EXAMPLE 5

A solution of 32 parts of bromine and 50 parts of potassium bromide in 500 parts of water is added during 1½ hours to a vigorously stirred mixture of 23 parts of triethylene glycol diallyl ether and 1,000 parts of water. The resulting mixture is then extracted with three portions of 140 parts of methylene chloride and this solution is then reacted with sodium hydroxide solution as described in Example 4 and the product further worked up to provide triethyleneglycol diglycidyl ether as described in Examples 1–3.

EXAMPLE 6

15.8 parts of triethylene glycol diallyl ether are added to a solution of 18.8 parts of perbenzoic acid in 300 parts of chloroform. The resulting solution is kept at 37° C. for 16 hours and is then stirred at 0° C. with a mixture of 100 parts of water and 13 parts of sodium hydrogen carbonate. The aqueous layer is removed and extracted with 3 portions of 150 parts of chloroform. This extract is dried over sodium sulphate and the solvent evaporated in vacuo. There is obtained crude triethylene glycol diglycidyl ether which is purified as described in Example 1.

EXAMPLE 7

A solution of trifluoroperacetic acid in 70 parts of methylene dichloride is prepared, as described in the Journal of the American Chemical Society, vol. 77 (1955) at p. 89, from 76 parts of trifluoroacetic anhydride and a concentrated aqueous solution containing 10.5 parts of hydrogen peroxide. This solution is added over 30 minutes to a well stirred mixture of 23 parts of triethylene glycol diallyl ether, 95 parts of anhydrous sodium carbonate and 270 parts of methylene chloride. The mixture is then boiled under reflux for a further 30 minutes and is then poured into 450 parts of cold water. The aqueous layer is removed and extracted with three portions of 140 parts of methylene chloride. Triethylene glycol diglycidyl ether is obtained from this combined extract as described in the previous examples.

EXAMPLE 8

1 part of propylene glycol and 1 part of triethylene glycol diglycidyl ether are mixed and the mixture is filtered through a bacterial filter. The sterile mixture is transferred aseptically into sterile containers which are sealed aseptically. The mixture thus contained is suitable for intravenous or intra-arterial injection into animals.

What we claim is:

1. A sterile, injectable pharmaceutical composition for parenteral administration, said composition comprising a physiologically-acceptable tumor-inhibiting quantity of sterile triethyleneglycol diglycidyl ether as the active component and a sterile, parenterally-administrable, essentially neutral solvent which is free of anions which react with epoxide groups.

2. A sterile, injectable pharmaceutical composition for parenteral administration according to claim 1 wherein the solvent is selected from the group consisting of propylene glycol, diethylene glycol mono methyl ether, diethylene glycol mono ethyl ether, glycerol formal, dimethylformamide and dimethylacetamide.

3. A method of selectively causing (A) mitotic inhibition and destruction of proliferating tumour cells within the mammalian body including gliomas in the brains; and concomitantly causing: (B) transient haemotological damage, limited mainly to the myeloid elements in the haemopoietic tissues, which results in depression in the level of the cellular components of the blood, principally the polymorphonuclear leucocytes from which haemotological damage recovery is rapid and complete; without similarly causing: (C) permanent and extensive mitotic inhibition and destruction of rapidly proliferating normal cells of the lymphoid tissues, intestinal epithelium, and germinal tissues of the reproductive organs; which comprises injecting into said mammalian body, the compound triethyleneglycol diglycidyl ether, in an amount sufficient to selectively cause (A), and concomitantly cause (B), without similarly causing (C).

4. The method of claim 3 wherein said compound is administered intravenously.

5. The method of claim 3 wherein said compound is administered in an amount between 140 and 350 mg./kg. of the body weight of said mammal.

6. A method for the treatment of a tumour in tumour-bearing mammals including mammals bearing experimental tumours and affected with cancer of the brain and gliomas which comprises intra-arterially administering the compound triethyleneglycol diglycidyl ether in an amount sufficient to produce inhibition of the growth of the tumour without at the same time causing extensive and permanent damage to rapidly-proliferating normal tissue.

References Cited

UNITED STATES PATENTS

| | | | |
|---|---|---|---|
| 2,671,044 | 3/1954 | Crossley | 167—65 |
| 2,834,790 | 5/1958 | Bressler | 260—348 |
| 2,854,461 | 9/1958 | De Groote | 260—348 |

OTHER REFERENCES

Stacey et al., Annals of the New York Academy of Sciences, vol. 68, art. 3, pp. 682–701, 1958.

Brit. J. of Pharmacology and Chemotherapy, 1951, vol. 6, 235–255.

Schmidt Annals of the New York Academy of Sciences, vol. 68, art. 3, pp. 661–662, 1958.

LEWIS GOTTS, *Primary Examiner.*

SHEP K. ROSE, *Assistant Examiner.*